(12) United States Patent
Taylor et al.

(10) Patent No.: US 7,228,957 B1
(45) Date of Patent: Jun. 12, 2007

(54) SLIP CONVEYOR ASSEMBLY

(75) Inventors: Alfred Alexander Taylor, Lugarno (AU); Garry Ronald MacKay, Lidcombe (AU)

(73) Assignee: TNA Australia Pty Limited, Lidcombe, NSW (AU)

( * ) Notice: Subject to any disclaimer, the term of this patent is extended or adjusted under 35 U.S.C. 154(b) by 0 days.

(21) Appl. No.: 11/525,520

(22) Filed: Sep. 21, 2006

(30) Foreign Application Priority Data

Dec. 9, 2005 (AU) ............................. 2005906943

(51) Int. Cl.
*B65G 27/32* (2006.01)

(52) U.S. Cl. .................... 198/753; 198/758

(58) Field of Classification Search ............ 198/575, 198/577, 751, 753, 758, 763, 764, 750.2
See application file for complete search history.

(56) References Cited

U.S. PATENT DOCUMENTS

| 3,702,655 | A | * | 11/1972 | Cox ........................ 198/758 |
|---|---|---|---|---|
| 3,917,050 | A | * | 11/1975 | Gregor ...................... 198/753 |
| 4,663,917 | A | * | 5/1987 | Taylor et al. ................. 53/552 |
| 5,042,643 | A | * | 8/1991 | Akama ...................... 198/753 |
| 5,494,151 | A | * | 2/1996 | Kondo et al. ............... 198/757 |
| 5,777,232 | A | * | 7/1998 | Kurita et al. ............ 198/750.1 |
| 5,804,733 | A | * | 9/1998 | Kurita et al. ............... 198/756 |
| 5,865,297 | A | * | 2/1999 | Chiba et al. ................ 198/751 |
| 6,044,710 | A | * | 4/2000 | Kurita et al. ............. 198/752.1 |
| 6,206,180 | B1 | * | 3/2001 | Sekine et al. ............... 198/757 |
| 6,318,542 | B1 | * | 11/2001 | Ikeda et al. ................. 198/769 |
| 6,374,985 | B1 | * | 4/2002 | Nakashima et al. ........ 198/391 |
| 6,457,577 | B1 | * | 10/2002 | Ikeda et al. ............. 198/750.1 |

\* cited by examiner

*Primary Examiner*—James R. Bidwell
(74) *Attorney, Agent, or Firm*—Townsend and Townsend and Crew LLP

(57) ABSTRACT

A slip conveyor assembly (10) having a plurality of slip conveyors (11 to 16). Each slip conveyor (11 to 16) has a tray (18) providing a conveyor surface (20) along which product is delivered. The trays (18) are arrangeable and caused to reciprocate so that product may be conveyed in either longitudinal direction, with at least two of the trays being arrangeable to provide a gap (32) therebetween to provide for delivery of product from the conveyor assembly (10).

10 Claims, 4 Drawing Sheets

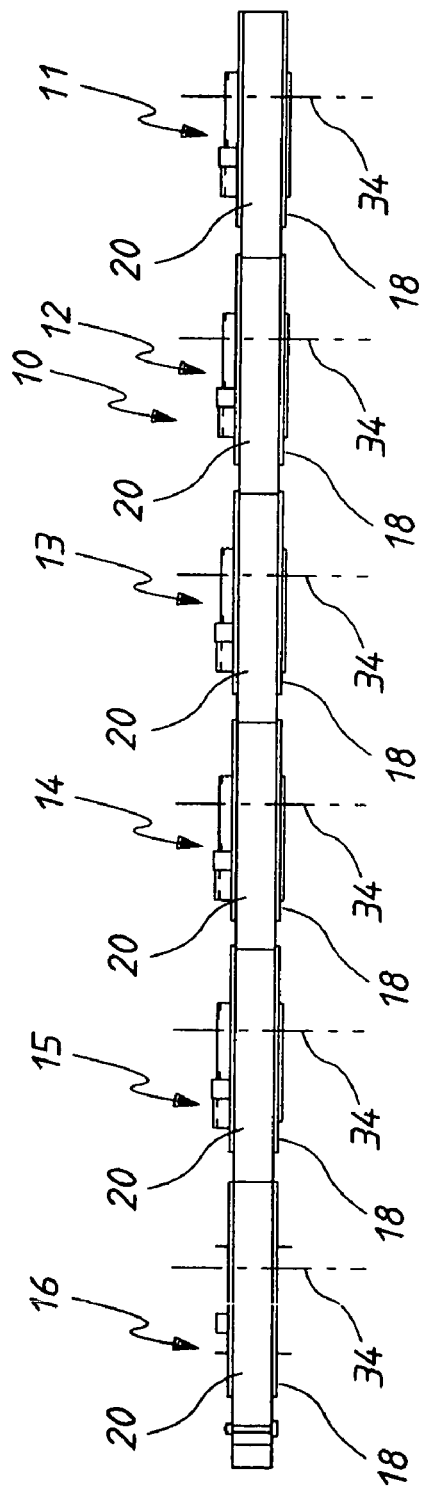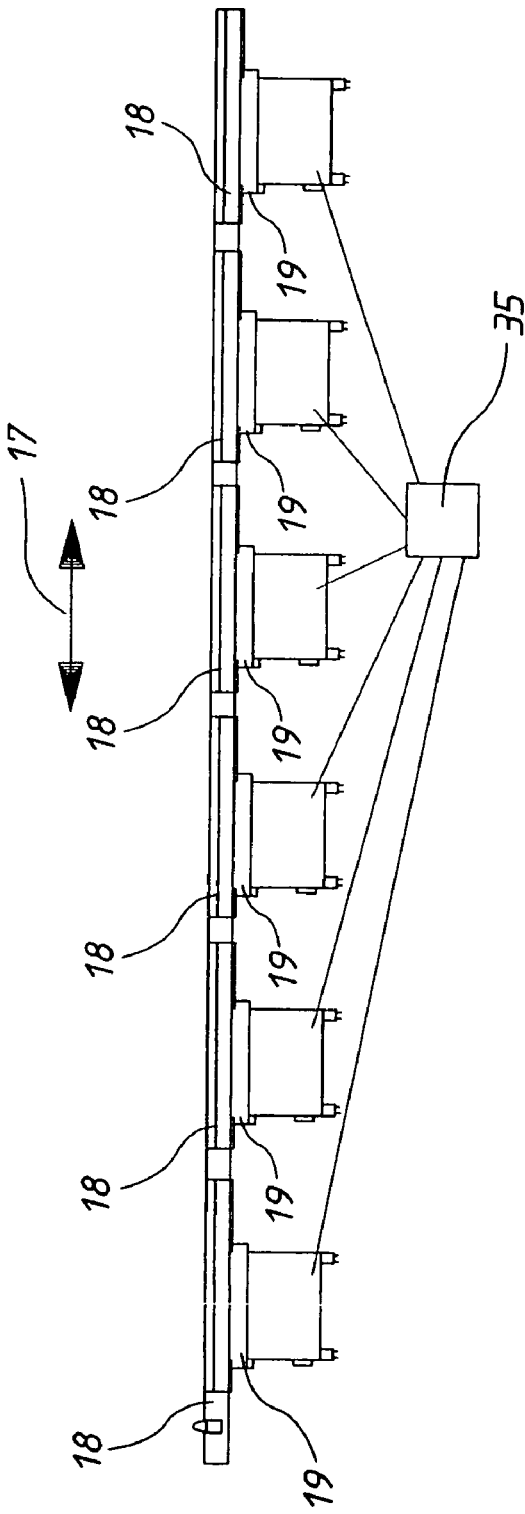

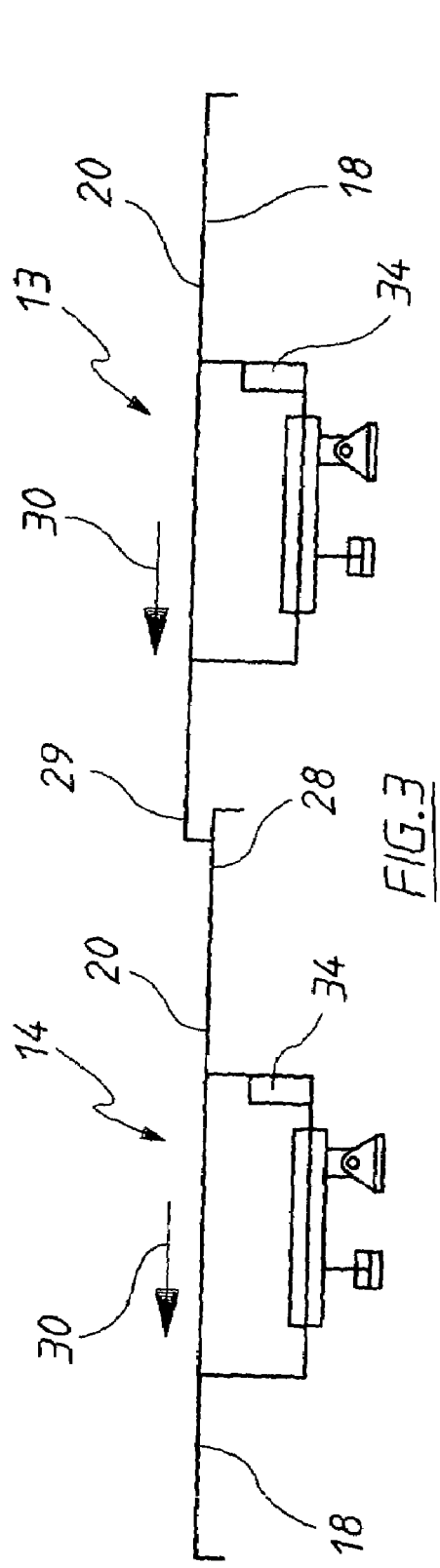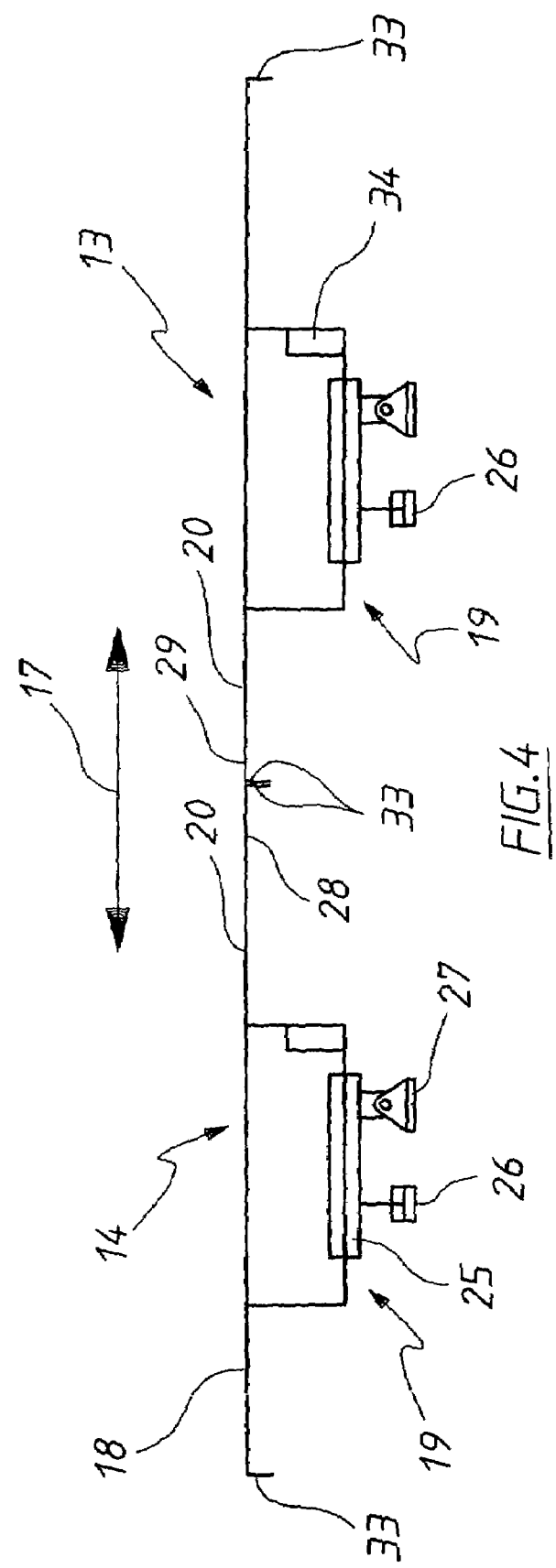

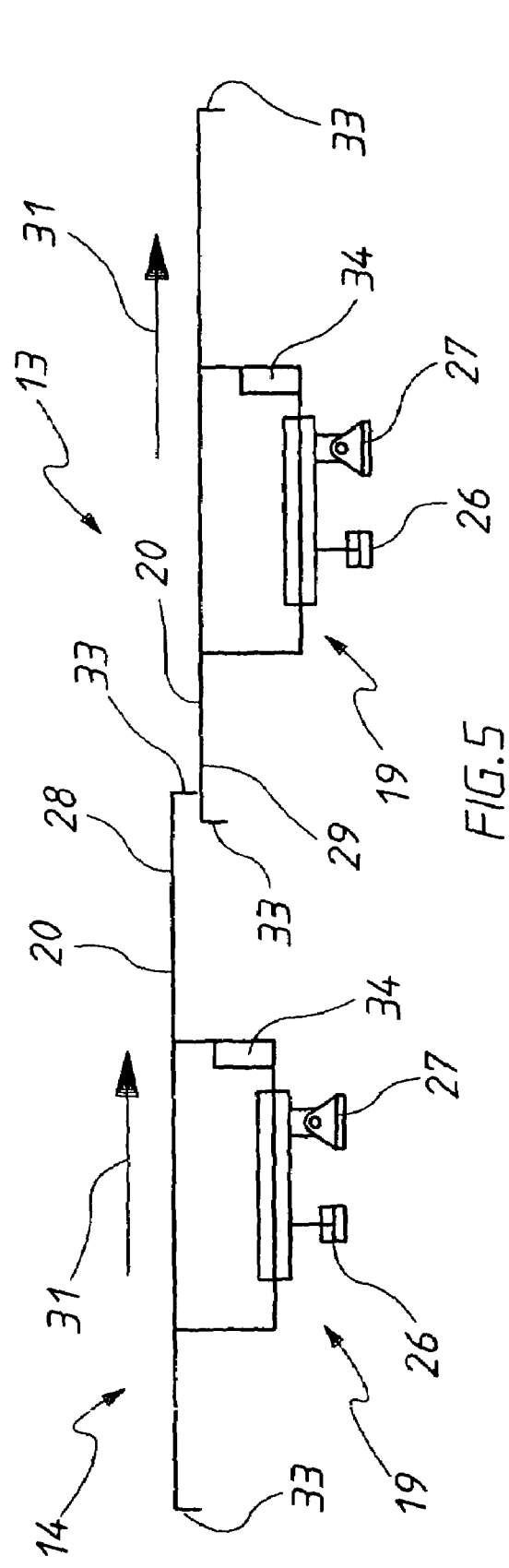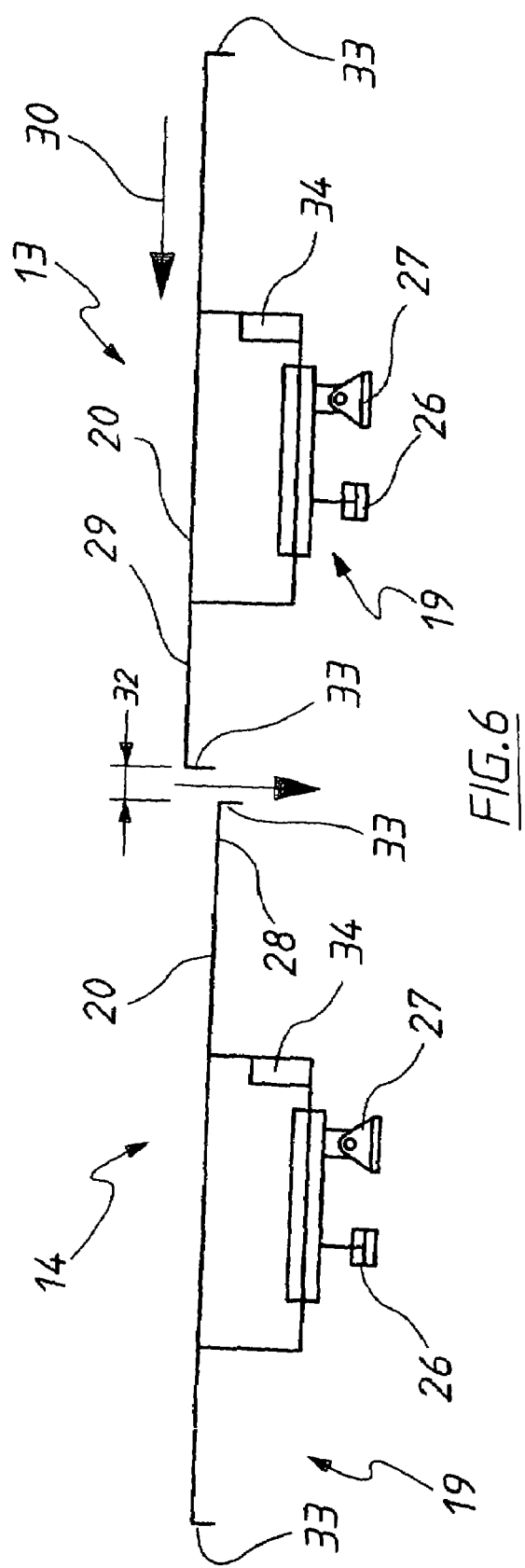

SLIP CONVEYOR ASSEMBLY

TECHNICAL FIELD

The present invention relates to slip conveyors and more particularly but not exclusively to slip conveyors used to convey product to packaging machines.

CROSS-REFERENCE TO RELATED APPLICATION

This application claims the priority of Australian Patent Application No. 2005906943, filed Dec. 9, 2005, the disclosure of which is incorporated herein by reference.

BACKGROUND OF THE INVENTION

In the packaging of snack foods as well as other products it is not uncommon for a considerable number of packaging machines and their associated weighing apparatus to receive product from a conveyor assembly. Such a packaging machine is disclosed in U.S. Pat. No. 4,663,917. Typically, the conveyor assembly will have gates along its length with product taken from each gate and delivered to an associated one of the packaging machines. These conveyors with their gate assemblies are complex. Accordingly they are generally expensive, difficult to maintain and in particular difficult to clean. This is a major issue where the product is a food.

A known type of conveyor is a slip conveyor. A slip conveyor includes a longitudinally extending tray with a surface along which the product is conveyed. The tray is longitudinally and in some instances also vertically reciprocated (oscillated) to cause the product to move from an upstream position to a downstream position on the tray. It is known to use slip conveyors in series. The trays are located so that the upstream end of one tray is located beneath the downstream end of the next adjacent upstream tray so that product is conveyed therealong. Product is removed from the conveyor assembly by displacing one of the trays so that there is no longer an overlap. Accordingly product then falls between the two adjacent trays. Such arrangements overcome the need for gates. However these arrangements have a number of disadvantages including positioning of the trays where there is a significant number of trays arranged in the assembly. In particular, if a number of trays are activated, appropriate gaps between adjacent trays may not occur.

Slip (vibratory) conveyors are described in U.S. Pat. Nos. 5,042,643, 5,494,151, 5,777,232, 5,804,733, 5,865,297, 6,044,710, 6,206,180, 6,318,542, 6,374,985 and 6,457,577, as well as U.S. patent applications 2002/0125109 and 2004/0112715 and Australian patent application 2005225102.

The conveyors described in the abovementioned USA patents and patent applications do not address the abovementioned problem associated with assemblies including a plurality of trays (conveyors).

OBJECT OF THE INVENTION

It is the object of the present invention to overcome or substantially ameliorate the above disadvantage.

SUMMARY OF THE INVENTION

There is disclosed herein a conveyor assembly including:
at least two conveyors arranged in series so that product delivered to a first one of the conveyors can be delivered to the next conveyor, each conveyor having:
a longitudinally extending conveyor surface that longitudinally conveys the product, and
a drive assembly for each conveyor surface and operatively associated therewith to cause movement of the associated conveyor surface to convey the product;
said conveyor assembly further includes:
a control operatively associated with the drive assemblies to co-ordinate operation thereof; and wherein
said conveyor surfaces include a first conveyor surface and a second conveyor surface, with the first and second conveyor surfaces being adjacent and having adjacent end portions,
the drive assemblies associated with the adjacent surfaces providing for relative longitudinal and vertical movement between the adjacent end portions; and
said control co-ordinates operation of the drive assemblies of the first and second surfaces so that the end portions are moved relative to each other between a first configuration in which the end portions vertically overlap so that product is conveyed in a first longitudinal direction, and a second configuration in which the overlapping end portions are reversed in relationship so that the conveyor assembly conveys product in a reverse direction to said first longitudinal direction by operation of the drive assemblies.

Preferably, the conveyor assembly is a slip conveyor assembly, and each conveyor is a slip conveyor.

Preferably, each slip conveyor includes:
a longitudinally extending conveyor tray providing a respective one of the conveyor surfaces along which the product is conveyed by longitudinal reciprocation of the tray and therefore the respective surface, and wherein
each drive assembly is operatively associated with a respective one of the trays to cause operation thereof to convey the product.

Preferably, the drive assemblies are operable to locate at least two of the trays with abutting end portions so that the trays are longitudinally aligned, upon being controlled to do so by said control.

Preferably, the drive assemblies are operable to locate at least two adjacent trays in a position in which there is a longitudinal gap between the adjacent trays to provide for the delivery of product from the conveyor assembly through the gap.

Preferably, each drive assembly includes a belt attached to a respective one of the trays, and an electric motor operatively associated with the belt to cause reciprocation of the belt and therefore the associated tray.

Preferably, each belt is a loop, with each belt passing about a pair of associated pulleys, with one of the pulleys being driven by said motor.

Preferably, the drive assemblies are operable to reciprocate the trays in phase.

Preferably, each drive assembly is adapted to reciprocate its associated tray through a longitudinal stroke, and wherein the trays have the same stroke.

Preferably, at least some of the trays is pivotally supported for pivoting movement about an axis transverse of the conveyor surfaces to provide for the vertical relative movement between said adjacent end portions.

BRIEF DESCRIPTION OF THE DRAWINGS

A preferred form of the present invention will now be described by way of example with reference to the accompanying drawings wherein:

FIG. 1 is a schematic side elevation of a slip conveyor assembly;

FIG. 2 is a schematic top plan view of the assembly of FIG. 1;

FIGS. 3 to 6 are schematic side elevations of portions of the conveyor assembly of FIGS. 1 and 2 in various configurations.

DETAILED DESCRIPTION OF THE PREFERRED EMBODIMENT

Figure 7:
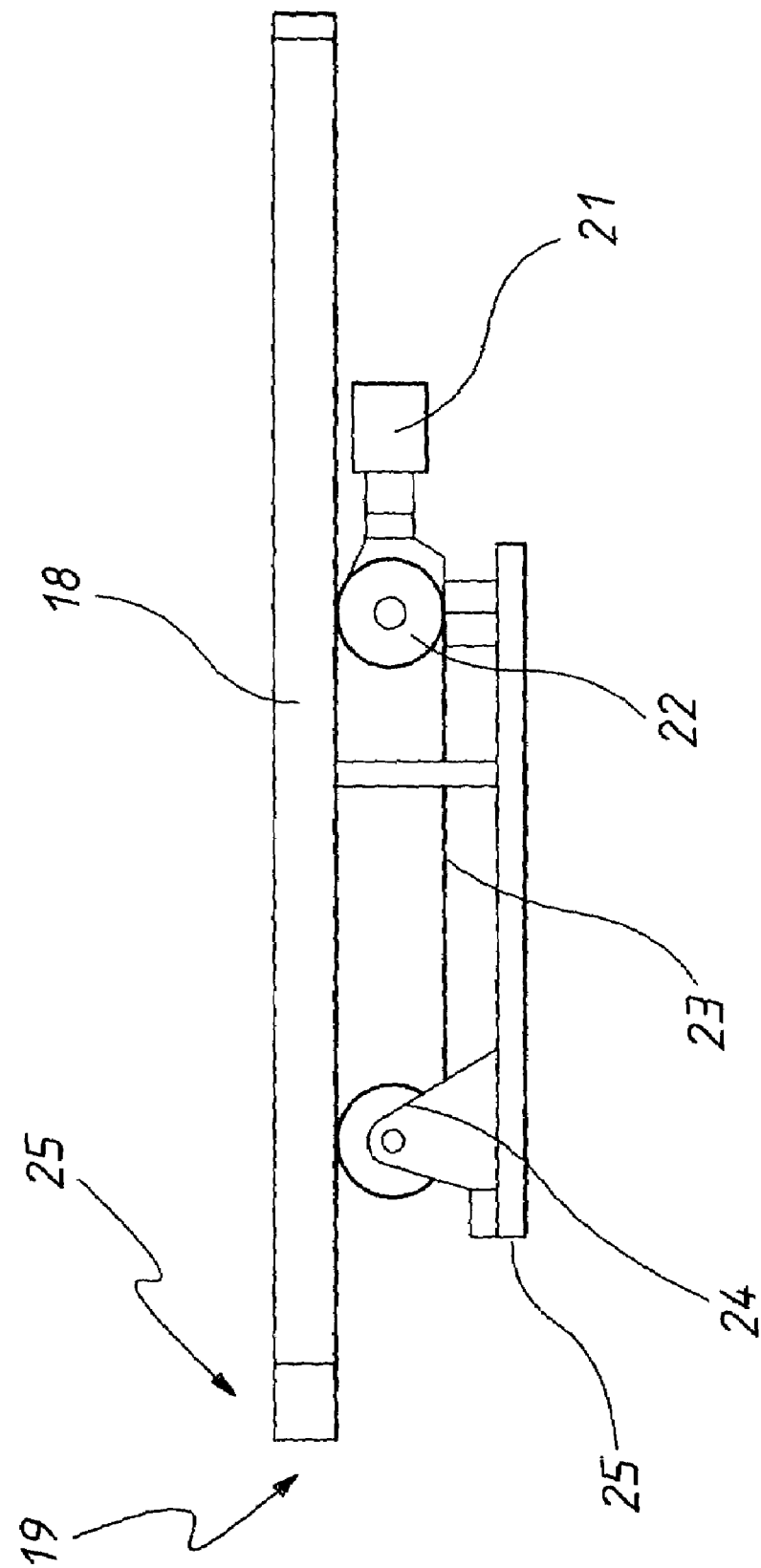
FIG. 7 is a schematic side elevation of a drive assembly employed in the assemblies of FIGS. 1 and 2.

In the accompanying drawings there is schematically depicted a slip (vibratory) conveyor assembly 10. The assembly 10 consists of at least three slip conveyors. In the present embodiment there are six slip conveyors 11, 12, 13, 14, 15 and 16. The conveyors 11 to 16 are arranged in series and are operated so that product can be conveyed in either longitudinal direction 17. Each conveyor 11 to 16 includes a tray 18 of "U" transverse cross-section extending longitudinally in the direction 17. Each tray 18 includes an upwardly facing surface 20 that is also generally horizontally longitudinally extending and conveys the product in the direction 17.

Each tray 18 is operated by a drive assembly 19 that horizontally reciprocates (oscillates) the associated tray 18 to cause product to advance along the surfaces 20.

Each drive assembly 19 includes an electric motor (servo motor) 21 that angularly drives a first pulley 22 to drive an endless belt 23. Each belt 23 passes about an "idler" pulley 24. Each motor 21 is operated to cause reciprocation of the belt 23 to thereby cause reciprocation (oscillation) of the associated tray 18.

Each conveyor 11 to 16 includes a computer 34 that controls operation of its associated motor 21, the computers 34 being electronically linked to a control assembly 35 so that operation of the motors 21 is coordinated.

The drive assembly 19 further includes a base 25 as well as a linear motor 26 and pivot assembly 27. The pivot assembly 27 provides a pivot axis 34 extending generally transverse of the assembly 10 so that the inclination of the surface 20 may be altered. Alteration of the inclination of the surface 20 being affected by operation of the linear motor 26. By operation of the linear motor 26, the surface 20 is caused to pivot about the pivot axis provided by the pivot assembly 27. Each motor 26 is controlled by the associated computer 34.

By operation of the motor 26, the surfaces 20 are arrangeable in a number of configurations as shown in FIGS. 3 to 6. In the arrangement of FIG. 3 adjacent end portions 28 and 29 of the surfaces 20 vertically overlap, with the surfaces 20 vibrated to cause product to pass in the direction of the arrows 30.

In the arrangement of FIG. 4, the surfaces 20 are longitudinally aligned with end portions 28 and 29 abutting so that product may be conveyed in either direction 17.

In the configurations shown in FIG. 5 again the end portions 28 and 29 overlap but their relationship reverse relative to FIG. 3 so that product is conveyed in the direction 31.

By arranging the surfaces 20 in the configuration shown in FIG. 3 or FIG. 5, a gap 32 may be created between adjacent surfaces 20 so that product may be delivered through the gap 32 to an associated piece of apparatus such as a packaging machine.

By operation of the motors 21, the surfaces 20 are arrangeable in various start positions and are then longitudinally reciprocated. Accordingly the end portions 28 and 29 are movable longitudinally relative to each other as well as vertically to provide for the various configurations as shown in FIGS. 3 to 6.

Preferably the motors 21 are operated so that the surfaces 20 reciprocate in phase and with the same stroke.

Preferably each tray 18 terminates with an end flange 33 that abut when arranged as shown in FIG. 4. If so required a resilient pad may be attached to at least some of the flanges 33 so that when arranged in FIG. 4 the pad is located between adjacent flanges 33. Each computer 34 controls its associated motors 21 and 34 with the central control assembly (computer) 35 then coordinating the computers 34.

The above described preferred embodiment has a number of advantages including being able to convey product in both directions. For example in the packaging of snack foods, it may be desirable to remove product away from a particular packaging machine that may be inoperative. A further advantage is being able to select a position along the assembly 10 at which product is to be delivered from the assembly 10 via an arranged gap 32.

The invention claimed is:

1. A conveyor assembly including:
   at least two conveyors arranged in series so that product delivered to a first one of the conveyors can be delivered to the next conveyor, each conveyor having:
   a longitudinally extending conveyor surface that longitudinally conveys the product, and
   a drive assembly for each conveyor surface and operatively associated therewith to cause movement of the associated conveyor surface to convey the product;
   said conveyor assembly further includes:
   a control operatively associated with the drive assemblies to co-ordinate operation thereof; and wherein
   said conveyor surfaces include a first conveyor surface and a second conveyor surface, with the first and second conveyor surfaces being adjacent and having adjacent end portions,
   the drive assemblies associated with the adjacent surfaces providing for relative longitudinal and vertical movement between the adjacent end portions; and
   said control co-ordinates operation of the drive assemblies of the first and second surfaces so that the end portions are moved relative to each other between a first configuration in which the end portions vertically overlap so that product is conveyed in a first longitudinal direction, and a second configuration in which the overlapping end portions are reversed in relationship so that the conveyor assembly conveys product in a reverse direction to said first longitudinal direction by operation of the drive assemblies.

2. The conveyor assembly of claim 1, wherein the conveyor assembly is a slip conveyor assembly, and each conveyor is a slip conveyor.

3. The conveyor assembly of claim 2, wherein each slip conveyor includes:
   a longitudinally extending conveyor tray providing a respective one of the conveyor surfaces along which the product is conveyed by longitudinal reciprocation of the tray and therefore the respective surface, and wherein
   each drive assembly is operatively associated with a respective one of the trays to cause operation thereof to convey the product.

4. The conveyor assembly of claim 3, wherein the drive assemblies are operable to locate at least two of the trays with abutting end portions so that the trays are longitudinally aligned, upon being controlled to do so by said control.

5. The conveyor assembly of claim 3, wherein the drive assemblies are operable to locate at least two adjacent trays in a position in which there is a longitudinal gap between the adjacent trays to provide for the delivery of product from the conveyor assembly through the gap.

6. The conveyor assembly of claim 4, wherein each drive assembly includes a belt attached to a respective one of the trays, and an electric motor operatively associated with the belt to cause reciprocation of the belt and therefore the associated tray.

7. The conveyor assembly of claim 6, wherein each belt is a loop, with each belt passing about a pair of associated pulleys, with one of the pulleys being driven by said motor.

8. The conveyor assembly of claim 3, wherein the drive assemblies are operable to reciprocate the trays in phase.

9. The conveyor assembly of claim 8, wherein each drive assembly is adapted to reciprocate its associated tray through a longitudinal stroke, and wherein the trays have the same stroke.

10. The conveyor assembly of claim 3, wherein at least some of the trays is pivotally supported for pivoting movement about an axis transverse of the conveyor surfaces to provide for the vertical relative movement between said adjacent end portions.

\* \* \* \* \*